United States Patent [19]
Stach et al.

[11] Patent Number: 5,918,947
[45] Date of Patent: Jul. 6, 1999

[54] WHEEL FOR A MOTOR VEHICLE AND METHOD OF MAKING SAME

[75] Inventors: Jens Stach, Eberdingen; Reinhold Separautzki, Moeglichen, both of Germany

[73] Assignee: Dr. Ing. h.c.F. Porsche AG, Weissach, Germany

[21] Appl. No.: 08/965,285

[22] Filed: Nov. 6, 1997

[30] Foreign Application Priority Data

Nov. 6, 1996 [DE] Germany ............................ 196 45 639

[51] Int. Cl.⁶ .................................................. B60B 1/06
[52] U.S. Cl. ............................ 301/65; 301/64.1; 301/104
[58] Field of Search ................................ 301/64.1, 64.2, 301/64.3, 64.7, 65, 70, 104; 29/894.344, 894.345

[56] References Cited

U.S. PATENT DOCUMENTS

| | | | |
|---|---|---|---|
| 1,433,764 | 10/1922 | Waterbox et al. | 301/65 |
| 1,544,242 | 6/1925 | Lavery | 301/65 |
| 1,610,023 | 12/1926 | Meldrum | 301/65 |
| 1,937,799 | 12/1933 | Tarbox | 301/67 |
| 1,952,474 | 3/1934 | Tarbox | 301/104 |
| 2,032,797 | 3/1936 | Eksergian | 301/64.1 |
| 2,107,950 | 2/1938 | Lejeune | 29/894.344 |
| 3,807,805 | 4/1974 | Brede, III | 301/65 |
| 3,811,737 | 5/1974 | Lejeune | 301/64.1 |
| 4,280,736 | 7/1981 | Raudman | 301/64.7 |
| 5,360,261 | 11/1994 | Archibald et al. | 301/63.1 |

FOREIGN PATENT DOCUMENTS

| | | | |
|---|---|---|---|
| 2120180 | 11/1983 | United Kingdom | 301/64.1 |
| 96/25296 | 8/1996 | WIPO . | |

*Primary Examiner*—D. Glenn Dayoan
*Assistant Examiner*—Long Bao Nguyen
*Attorney, Agent, or Firm*—Evenson, McKeown, Edwards & Lenahan, P.L.L.C.

[57] ABSTRACT

A wheel for a motor vehicle has a rim spider provided with air openings and a rim well connected with this rim spider. The rim well and the rim spider are formed by shell parts which each have a molded-out interior and exterior wall and which are connected with one another by at least one connection. Between abutting wall areas of adjacent air openings of the shell parts, hollow spokes are formed and at least one exterior annulus and one interior annulus. On the interior side, the wheel parts are provided with reinforcing ribs on mutually opposite surfaces. The materials used for the wheel parts are a magnesium alloy, an aluminum alloy, a steel alloy or a titanium alloy.

23 Claims, 10 Drawing Sheets

WHEEL FOR A MOTOR VEHICLE AND METHOD OF MAKING SAME

BACKGROUND AND SUMMARY OF THE INVENTION

This application claims the priority of German Patent Application DE 196 45 639.8, the disclosure of which is expressly incorporated by reference herein.

The invention relates to wheel for a motor vehicle and a method of making a wheel for a motor vehicle, and more particularly to a wheel having hollow spokes.

A motor vehicle wheel is disclosed in commonly assigned pending U.S. patent application Ser. No. 08/706,266 filed on Sep. 4, 1996, the entire disclosure of which is expressly incorporated by reference herein, which comprises two shell parts, specifically a rim spider and a rim well, which are connected together to form the wheel. The two shell parts are connected with one another, for example by welding, proximate the air openings, proximate the hub, and proximate a rim hump at on exterior ring area of the two shell parts. The shell parts are molded out such that hollow spokes are formed between the air openings, and annuli are formed proximate the hub and proximate the hump.

It is an object of the invention to provide a vehicle wheel consisting of two shells which has an optimal stability and which is relatively simple to manufacture. It is also an object of the invention to provide a method of making such a vehicle wheel.

This and other objects have been achieved according to the present invention by providing a wheel for a motor vehicle comprising a rim spider connected to a rim well, said rim spider and said rim well defining a plurality of hollow spokes, a plurality of air openings between said hollow spokes, and a plurality of bolt receiving devices, wherein the rim spider includes a plurality of reinforcing ribs on an interior surface, said reinforcing ribs being arranged in at least one of an area between adjacent of said air openings and an area between the bolt receiving devices and the air openings.

This and other objects have also been achieved according to the present invention by providing a wheel for a motor vehicle comprising a rim spider connected to a rim well, said rim spider and said rim well defining a plurality of hollow spokes, a plurality of air openings between said hollow spokes, and a plurality of bolt receiving devices, wherein the rim well includes a plurality of reinforcing ribs on an interior surface, said reinforcing ribs being arranged in at least one of an area between adjacent of said air openings and an area between the bolt receiving devices and the air openings.

This and other objects have also been achieved according to the present invention by providing a method of manufacturing a wheel for a motor vehicle comprising: forming a rim spider for connection to a rim well to form a wheel including a plurality of hollow spokes, a plurality of air openings between said hollow spokes, and a plurality of bolt receiving devices, wherein said rim spider is formed to define a plurality of reinforcing ribs on an interior surface of said rim spider in at least one of an area between adjacent of said air openings and an area between the bolt receiving devices and the air openings.

The present invention advantageously optimizes stability of the rim spider and of the rim well, due to the arrangement of ribs on the interior surface of the rim spider and on the interior surface of the rim well, particularly in areas between the air openings and/or in areas of the wheel bolt receiving devices and/or in areas of the hub. In this way, an optimum stability of the whole wheel is achieved.

The reinforcing ribs are arranged in areas of the rim spider and/or of the rim well which are relatively structurally weaker, in order to provide a definite reinforcement in these areas. Such a reinforcement is particularly beneficial in the case of a narrow wall thickness. Furthermore, the type of the reinforcing ribs and their number are also dependent on the material of the rim spider and of the rim well. Thus, for example, in the case of a rim spider or a rim well made of a relatively less strong material, such as a magnesium alloy, several reinforcing ribs are required, while, in the case of a rim spider or a rim well made of a relatively stronger material, such as an aluminum alloy, fewer reinforcing ribs are required.

In connection with the reinforcing ribs on the interior surface of the rim spider, a ring rib is provided which connects the projecting bolt receiving devices, is arranged concentrically to the wheel hub and is peripherally connected with the wheel bolt receiving devices.

At least two mutually crossing webs are provided between the air openings of the rim spider in the hollow spokes, in order to increase stability in the hollow spokes. These webs have a height which corresponds approximately to half the height of the pulled-up edges of the air openings. In particular, the height is selected such that the webs do not abut the opposite covering wall of the rim well.

In addition to the mutually crossing reinforcing ribs, additional reinforcing ribs are provided between the wheel bolt receiving devices and the edges of the air openings. The reinforcing ribs supplement one another on the whole in an advantageous manner such that the area is additionally reinforced starting from the wheel bolt receiving devices and radially into the hollow spokes. Furthermore, a strong connection is formed by way of the ring rib around the wheel hub and between the air openings.

Together, the reinforcing ribs approximately define a closed parallelogram which is adjoined by two triangles formed by mutually crossing sections of the reinforcing ribs.

The rim spider may be made of various materials, such as an aluminum alloy, a magnesium alloy, a titanium alloy or of a ferrous metal. The rim spider can be manufactured by a casting process, for example, in the case of light-metal materials, by an injection molding process or another manufacturing process, such as a forming process or a pressing process.

The rim well and the rim spider can be made of a magnesium alloy. However, both the rim well and the rim spider may be made of an aluminum alloy. It is also possible to manufacture the rim well and the rim spider of different materials, such as an aluminum alloy and a magnesium alloy. Thus, for example, the rim spider can be made of a magnesium alloy and the rim well can be made of an aluminum alloy or the rim spider can be made of an aluminum alloy and the rim well can be made of a magnesium alloy.

According to the stresses occurring on the wheel, the reinforcing ribs are placed locally on the interior side of the rim spider. Thus several longitudinally and/or transversely extending reinforcing ribs may also be arranged in the area of the hollow spokes which can be supplemented by ribs, webs or the like in areas between the air openings and the exterior edge of the rim spider. Mutually supplementing ribs, webs or the like may also be arranged in the direct hub area between the concentric reinforcing rib and the wheel hub, in which case an additional concentric reinforcing rib is also conceivable between the bolt receiving devices and connects these with one another.

Other objects, advantages and novel features of the present invention will become apparent from the following detailed description of the invention when considered in conjunction with the accompanying drawings.

DETAILED DESCRIPTION OF THE DRAWINGS

Referring to the drawing figures, a wheel 1 for a motor vehicle consists essentially of two shell parts 2, 3, one shell part 3 forming the rim spider 3a and the other shell part 2 forming the rim well 2a. These shell parts 2 and 3 are connected with one another. As a result of the configuration of the shell parts 2 and 3 in areas between air openings 5 and 11 in the rim spider 3a and in the rim well 2a, hollow spokes H and annuli R1 and R2 are formed when the shell parts 2 and 3 are connected.

Figure 1:
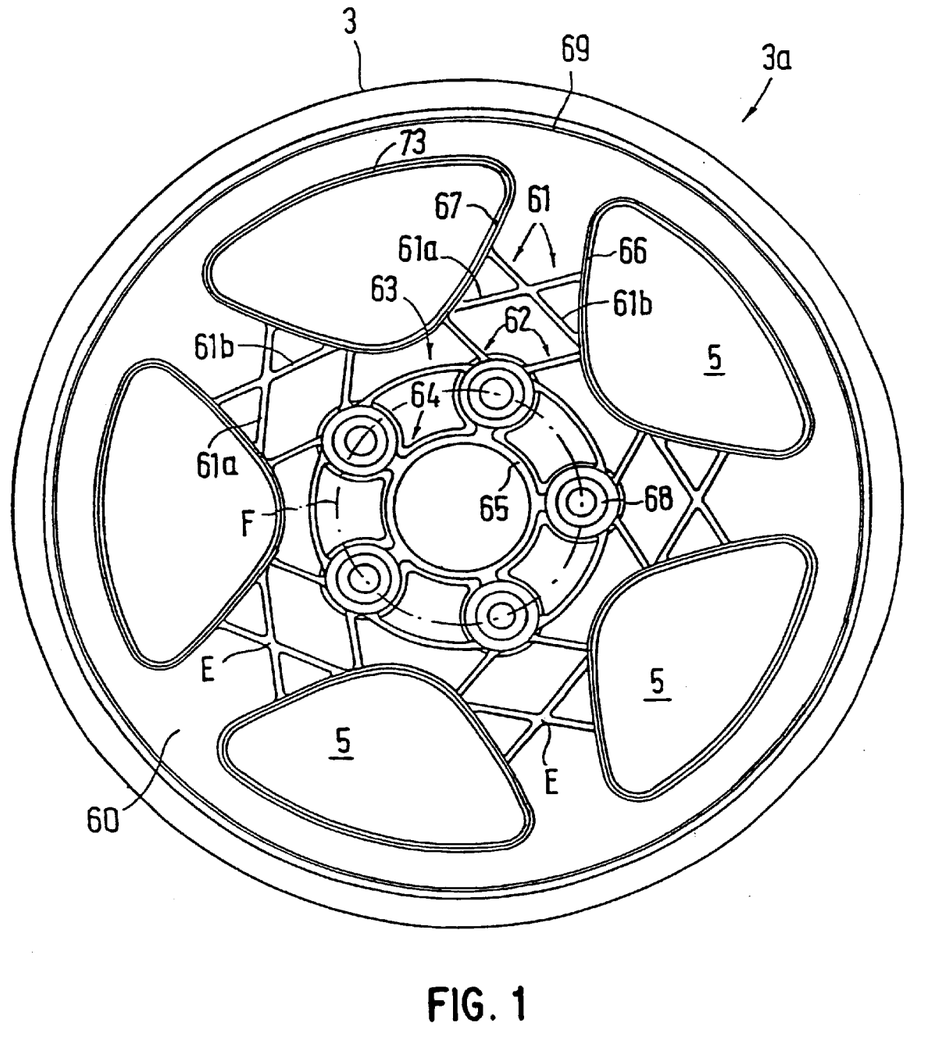
FIG. 1 is an inside view of a rim spider having reinforcement ribs in the hub area and between the air openings, according to a preferred embodiment of the present invention.
Figure 2:
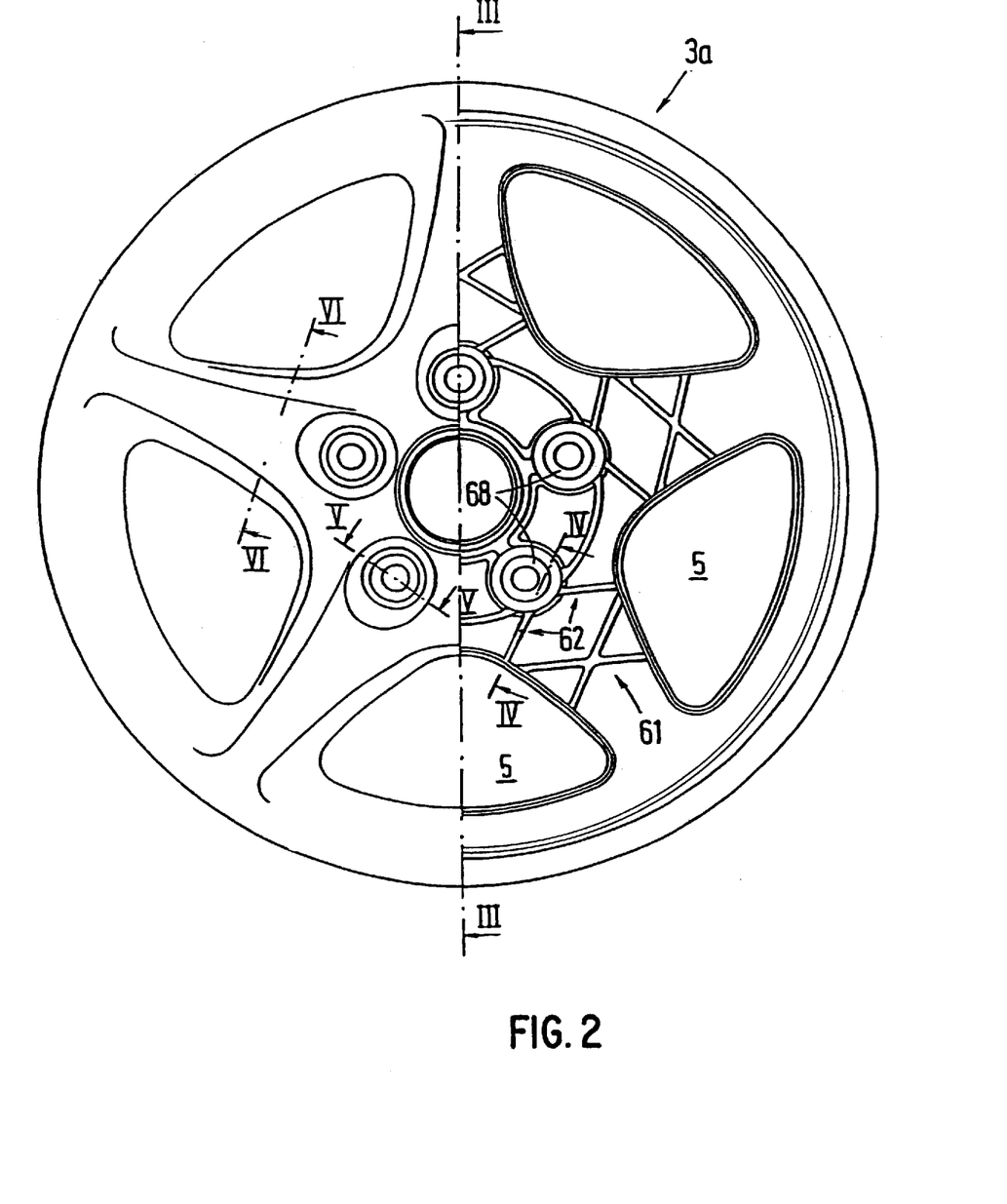
FIG. 2 is a partially cut-away view of the rim spider of FIG. 1.

On its interior surface 60, the rim spider 3a has reinforcing ribs 61, 62, 63, 64 and a wheel hub 65. Alternatively, the wheel may be provided with any individual ones of the reinforcing ribs 61, 62, 63, 64 or any subcombination thereof. FIG. 1 illustrates a complete arrangement of all of these reinforcing ribs with the wheel hub in the rim spider 3a.

The reinforcing ribs 61 consist of mutually crossing webs which are connected at their longitudinal ends to raised opening edges 66 and 67 of adjacent air openings 5. The reinforcing ribs are connected along their longitudinal course to the interior surface 60 of the rim spider 3a.

The additional reinforcing ribs 62 diverge at an obtuse angle from the projecting bolt receiving devices 68 and extend to the opening edges 66 and 67.

The bolt receiving devices 68 are connected with one another by means of a ring rib 63 arranged concentrically with respect to the wheel hub 65. Between the wheel hub 65 and the bolt receiving devices 68, radial ribs 64 are provided which are connected with the wheel hub 65 and with the bolt receiving devices 68.

The two mutually crossing reinforcing ribs 61 comprise two webs arranged at an acute angle with respect to one another. Together with the other two diverging ribs 62, sections 61a and 61b of the ribs 61 form approximately a parallelogram. The crossing point E of the ribs 61 is situated on a plane extending through the wheel center which is situated at the same distance from the opening edges 66, 67, i.e., at a midpoint between adjacent air openings 5.

As a function of the material used for forming the rim spider 3a, an appropriate number of reinforcing ribs and an appropriate thickness thereof is selected to achieve a strong wheel structure. Thus, in the case of a rim spider 3a made of a relatively less strong material, such as magnesium alloy, a stronger ribbing is required than, for example, in the case of a rim spider 3a made of a relatively stronger material, such as an aluminum alloy. Furthermore, a stronger ribbing is also required in the case of narrow wall thicknesses.

Figure 10:
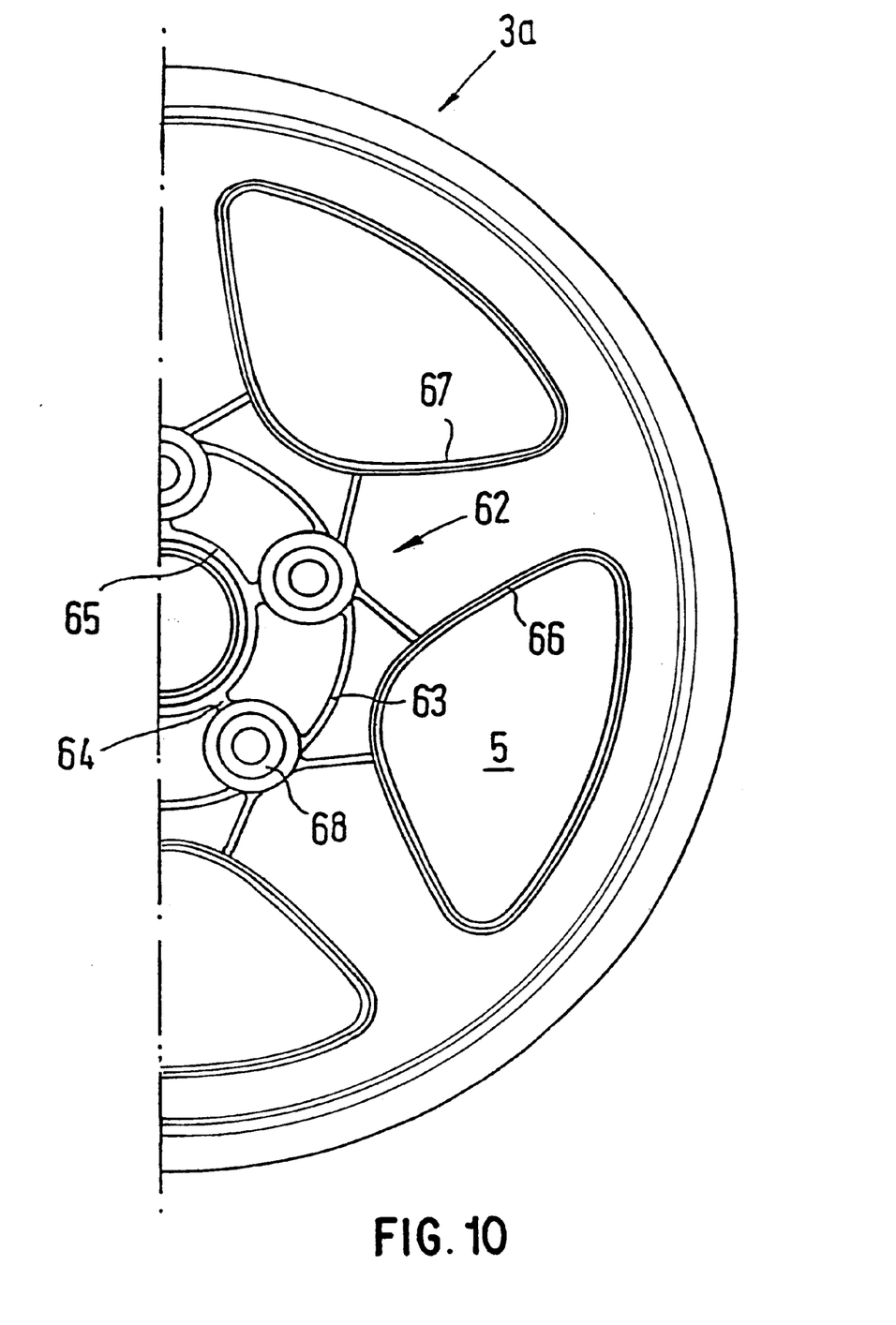
FIG. 10 is an inside view of another rim spider.

As an example, FIG. 1 illustrates a rim spider 3a made of a relatively less strong material, such as a magnesium alloy, which accordingly has a maximal ribbing of all of the reinforcing ribs 61, 62, 63 and 64. In contrast, FIG. 10 shows a rim spider 3a made of a relatively stronger material, such as an aluminum alloy, which accordingly has only the reinforcing ribs 62, 63 and 64, in which case the reinforcing rib 63 represents a ring rib and the reinforcing ribs 64 form radial ribs.

Figure 10A:
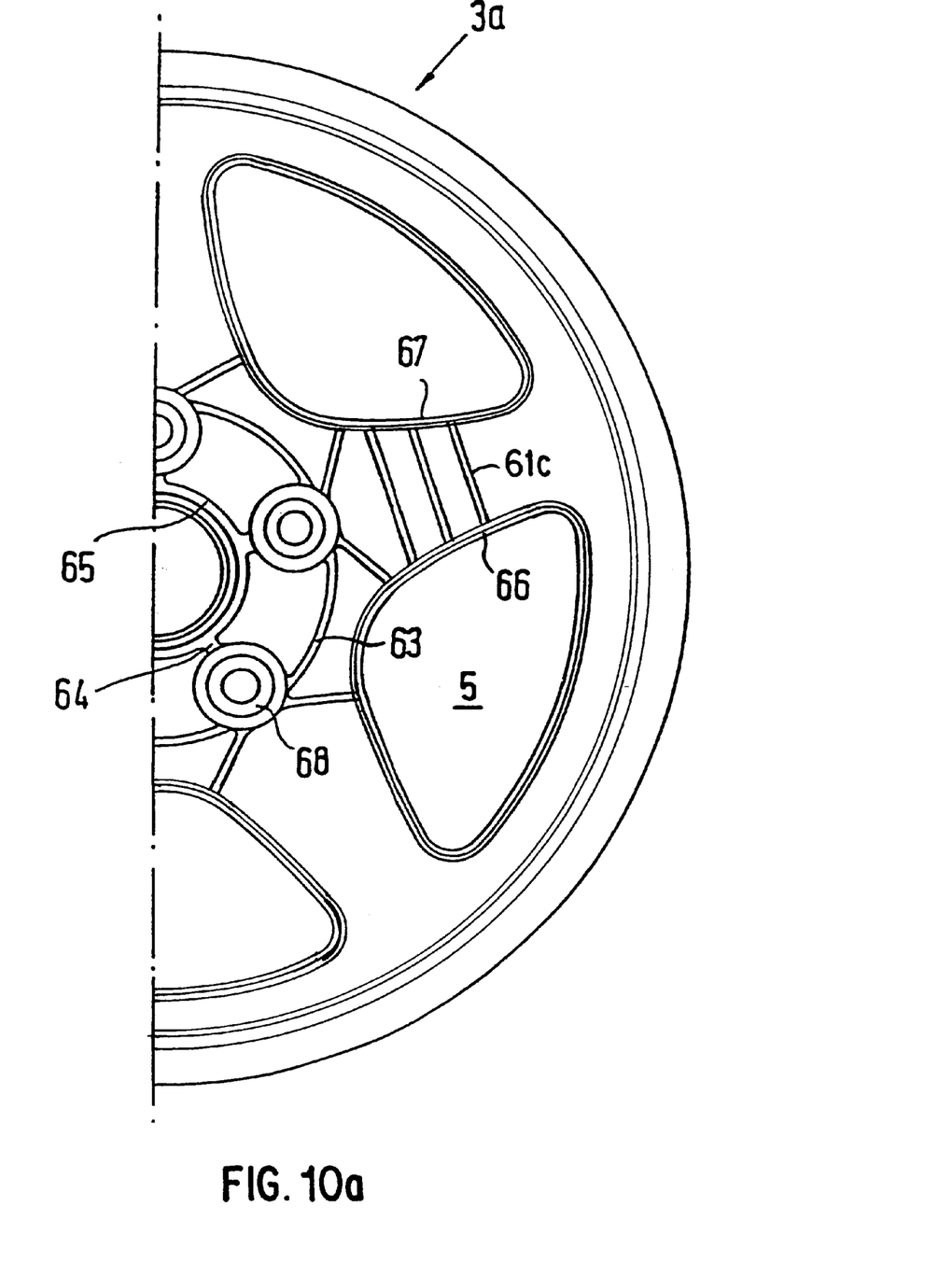
FIG. 10a is an inside view of another rim spider.
Figure 10B:
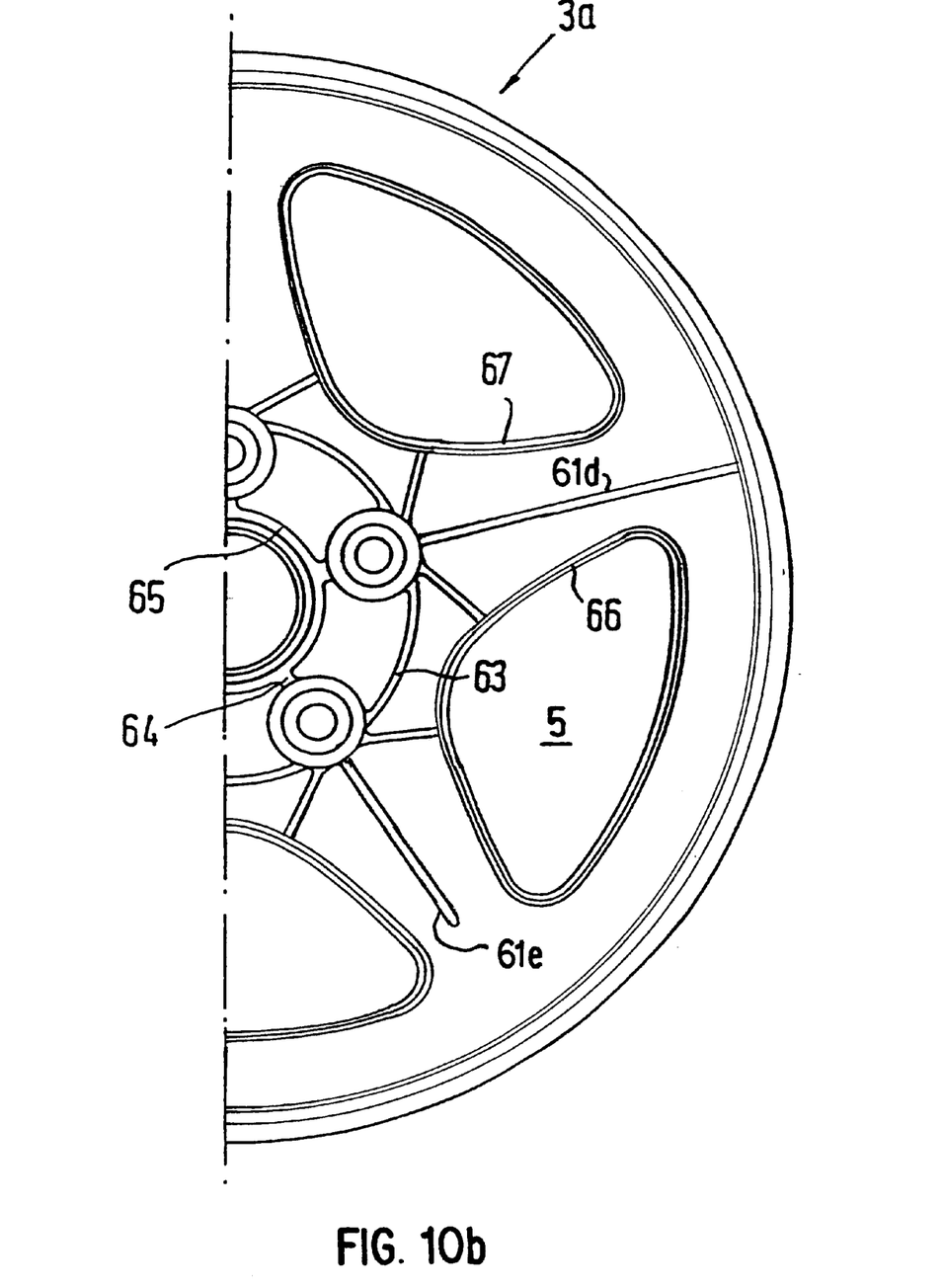
FIG. 10b is an inside view of another rim spider.
Figure 10C:
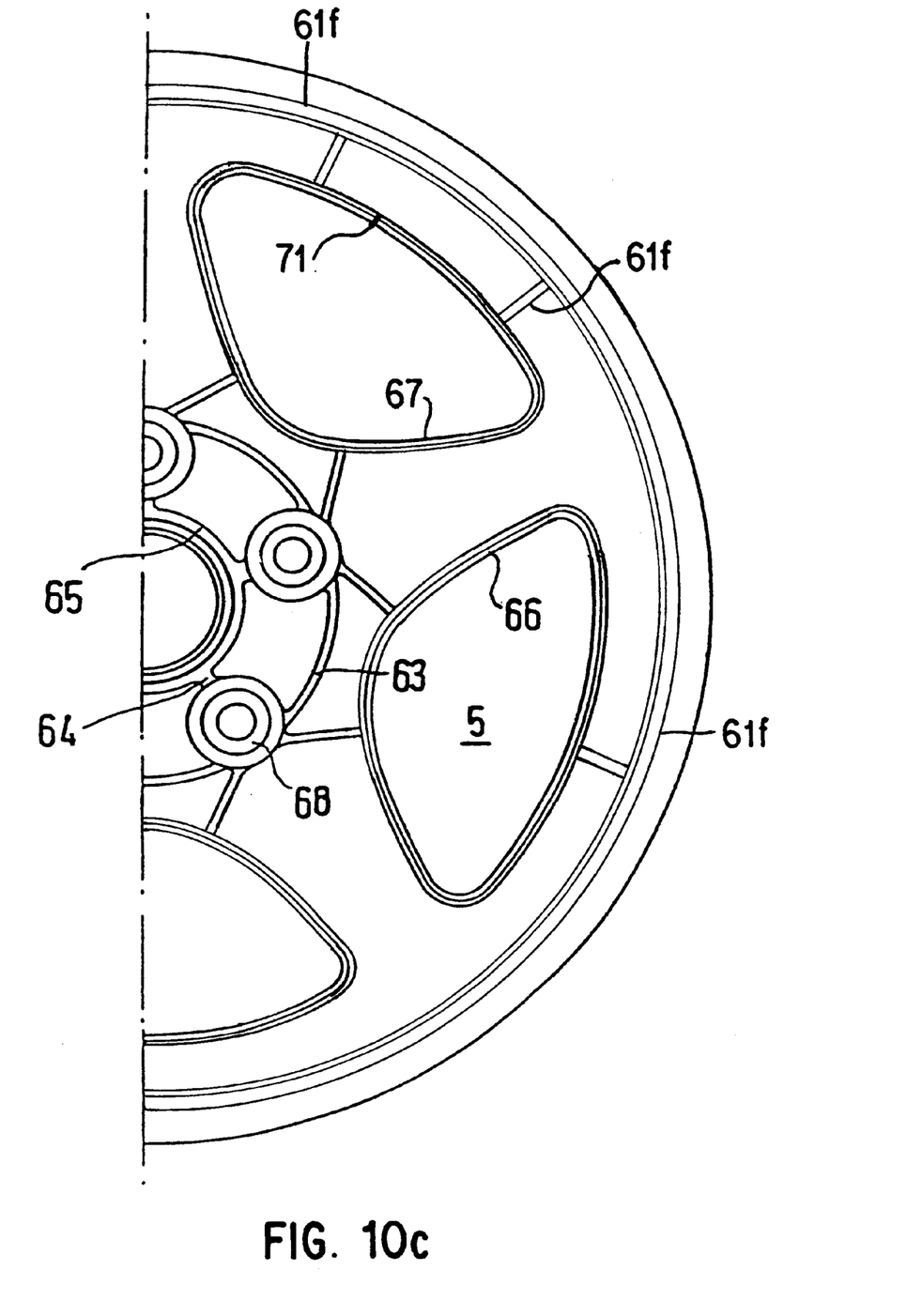
FIG. 10c is an inside view of another rim spider.
Figures 11, 13:
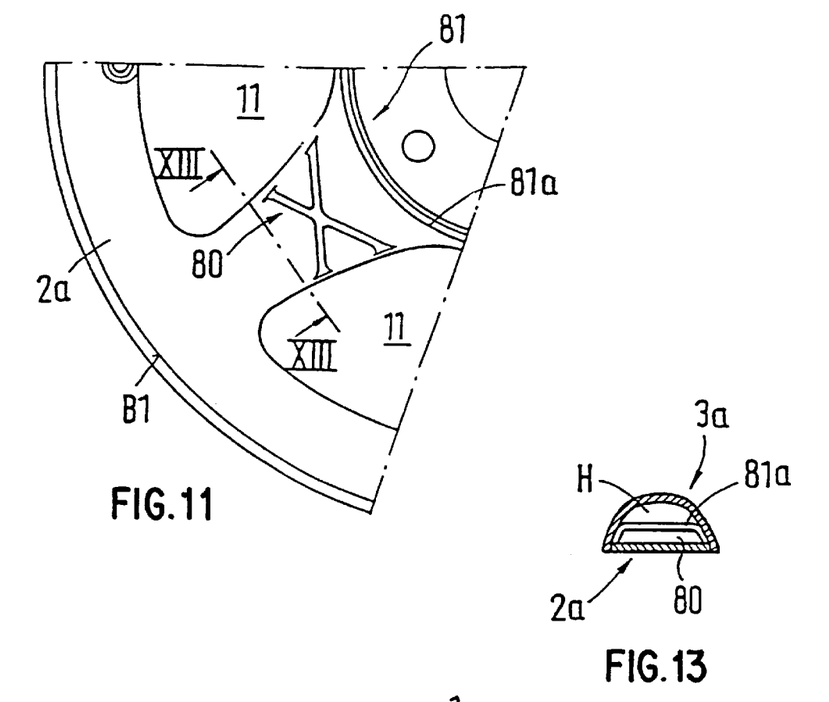
FIG. 11 is a view of another rim well taken in the direction of arrow Z in FIG. 12.
FIG. 13 is a sectional view according to Line XIII—XIII of FIG. 11.

The reinforcement of the rim spider 3a and/or the rim well 2a can be supplemented by way of several mutually crossing ribs 61a, 61b, 80 as shown in FIGS. 1 and 11. Alternatively and/or additionally, the rim spider 3a and/or the rim well 2a may be reinforced by lateral ribs 61c extending laterally between the air hole openings 5, as shown in FIG. 10a. Alternatively and/or additionally, the rim spider 3a and/or the rim well 2a may be reinforced by radial ribs 61d, 61e extending between the bolt receiving devices 68 and the exterior edge 69, as shown in FIG. 10b. Alternatively and/or additionally, the rim spider 3a and/or the rim well 2a may be reinforced by radial ribs 61f extending between the outer opening edge 71 and the exterior edge 69, as shown in FIG. 10c.

The diverging reinforcing ribs 62 have a diagonal upper edge course R from the bolt receiving device 68 to the opening edge 66 or 67.

Figure 3:
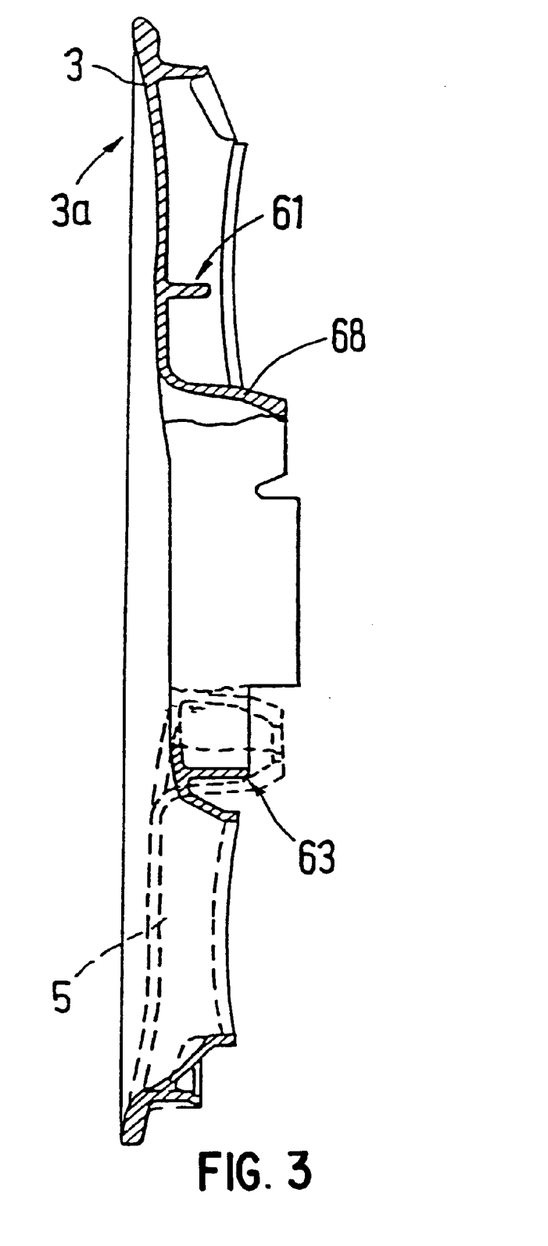
FIG. 3 is a sectional view taken along Line III—III of FIG. 2.
Figure 4:
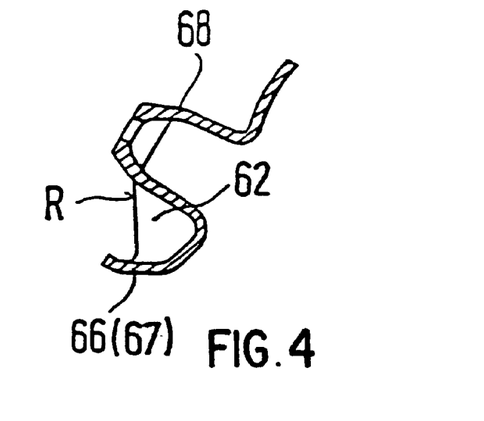
FIG. 4 is a sectional view taken along Line IV—IV of FIG. 2.
Figure 5:
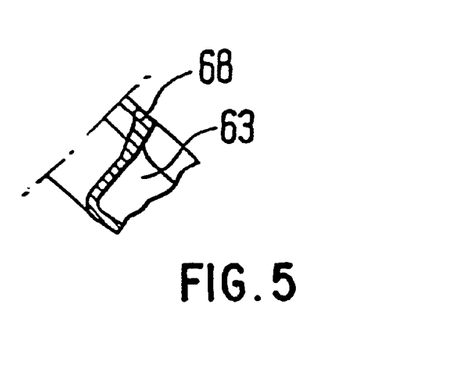
FIG. 5 is a sectional view taken along Line V—V of FIG. 2.
Figure 6:
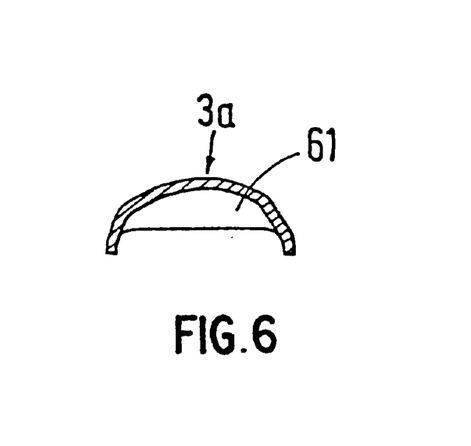
FIG. 6 is a sectional view taken along Line VI—VI of FIG. 2.
Figure 8:
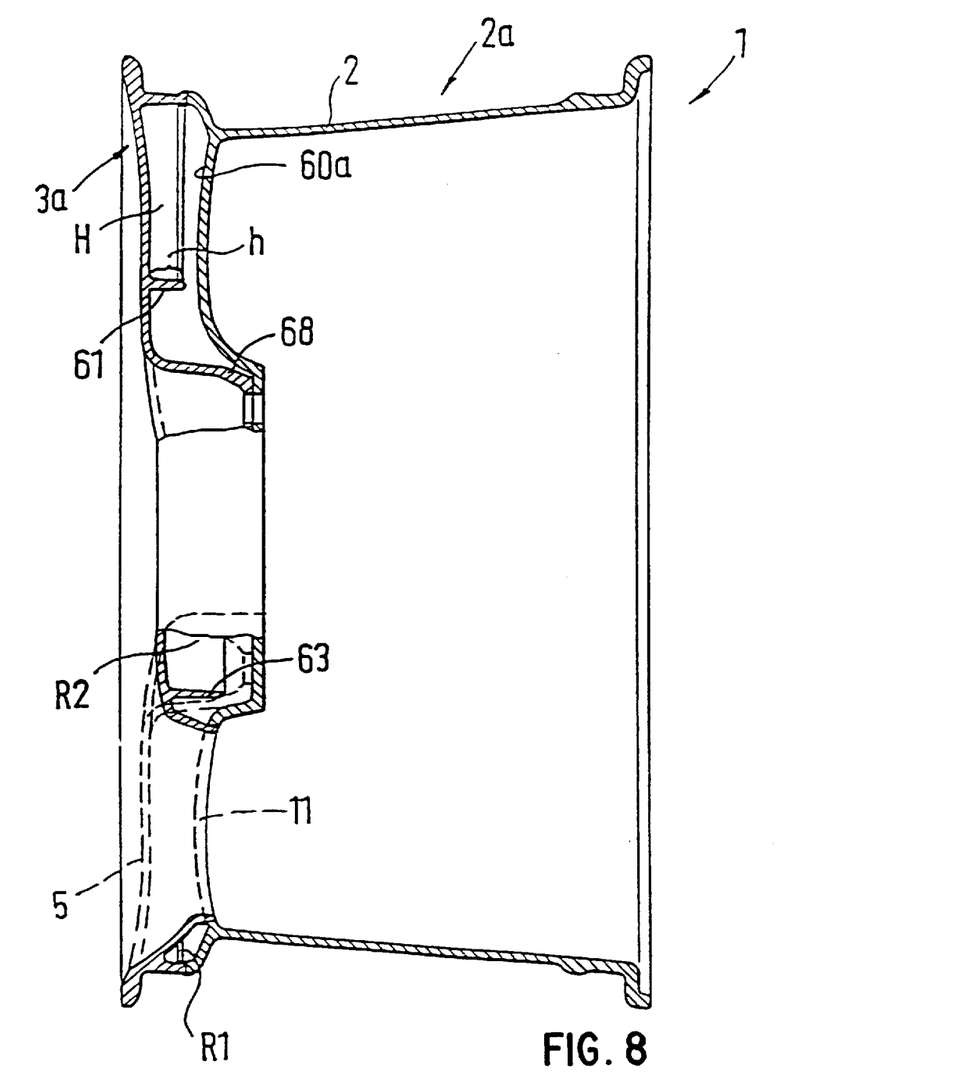
FIG. 8 is a sectional view taken along Line VIII—VIII of FIG. 7.

As illustrated in detail in FIGS. 3 and 8, the reinforcing ribs 61 of such a height h that a distance still exists to the interior surface 60a of the rim well 2a. This distance is provided as a tolerance to prevent interference during connection of the rim spider 3a and the rim well 2a, and to prevent problems which might occur if the ribs 61 contacted the interior surface 60a, such as noise during use of the wheel.

Figure 7:
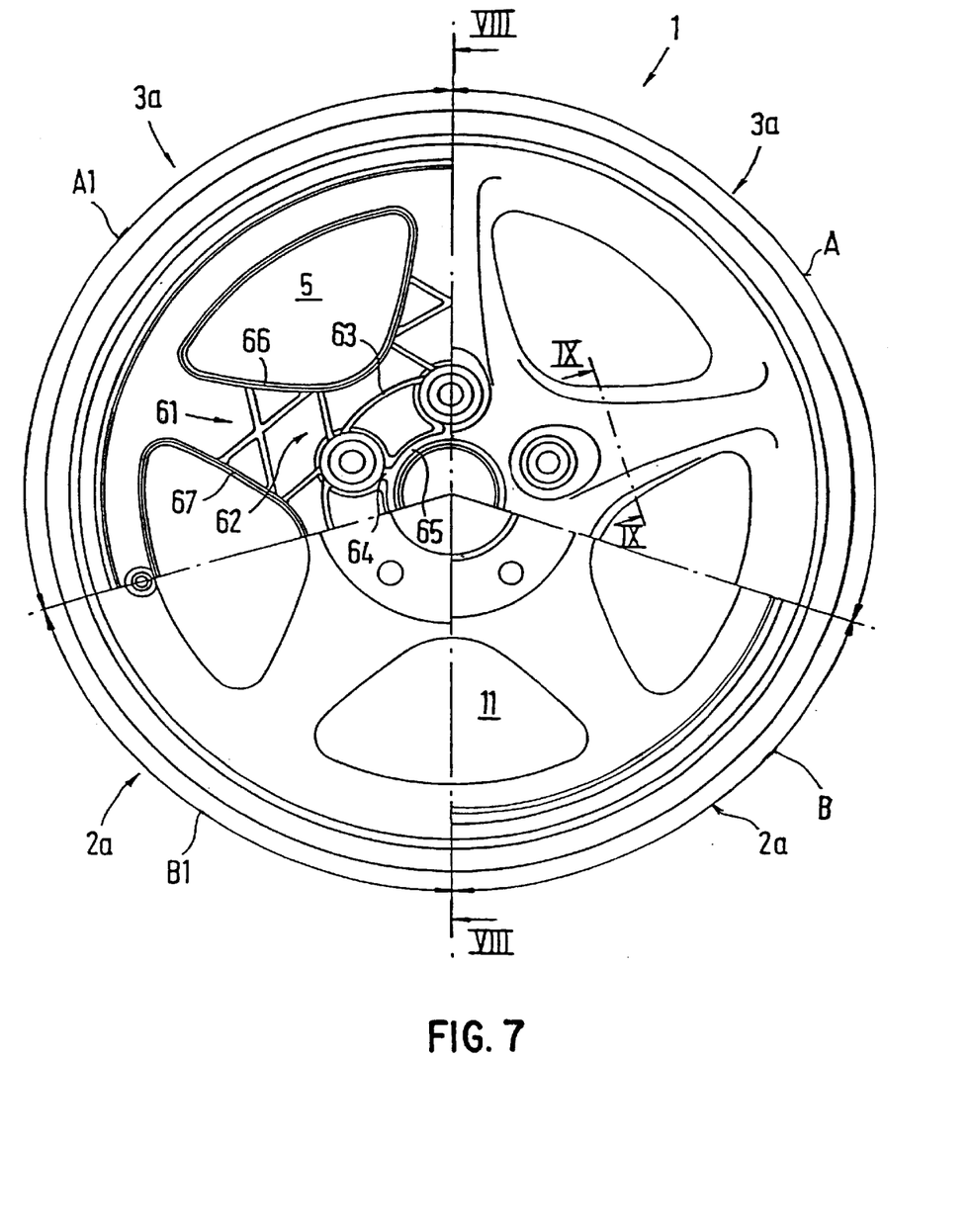
FIG. 7 is a partially cut-away view of wheel according to a preferred embodiment of the present invention including a rim spider connected to a rim well.

FIG. 7 shows the wheel 1 as a whole, in which case section A of the rim spider 3a is shown from the exterior side; section Al of the rim spider is shown from the interior side; and section B of the rim well 2a is shown from the exterior side and section Bi of the rim well 2a is shown from the interior side.

Figure 9:
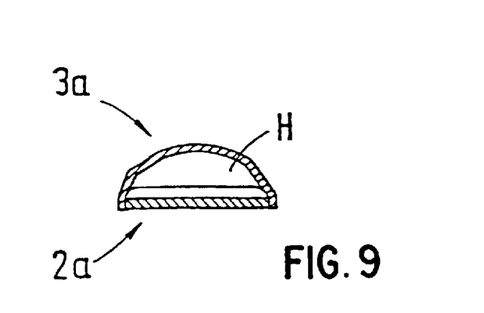
FIG. 9 is a sectional view taken along Line IX—IX of FIG. 7.

As illustrated in detail in FIG. 9, the rim spider 3a has an approximately semicircular construction in the area of the hollow spokes H of the wheel 1. The covering portion 2b of the rim well 2a has a plane construction. However, it may also have a semicircular shape.

Like the rim spider 3a, the rim well 2a may also have reinforcing ribs 80 on its interior surface 60a, for example having a configuration which corresponds to the ribs 61 of the rim spider 3a to be aligned therewith. These reinforcing ribs consist of mutually crossing webs between adjacent air openings 11, and an additional rib 81, which is constructed as a ring rib 81a. Alternatively, only the ribs 80 or only the ring rib 81a may be used, depending upon the material used and the strength required.

The ring rib 81a extends concentrically with respect to the wheel center or is arranged concentrically with respect to the wheel hub 65.

Figure 12:
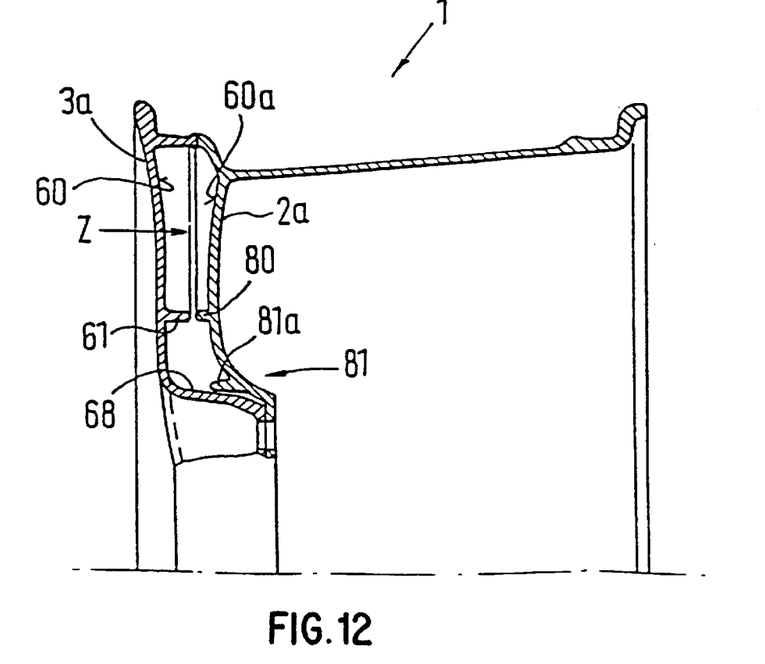
FIG. 12 is a sectional view of the assembled wheel parts having reinforcing ribs and a ring rib.

FIG. 12 is a detailed illustration of the mutually crossing ribs 61 and 80 of the rim spider 3a and of the rim well 2a. They are disposed approximately or directly opposite one another and have a distance between one another. As mentioned above, the distance is provided as a tolerance to prevent interference during connection of the rim spider 3a and the rim well 2a, and problems which might occur if the crossing ribs 61 and 80 contacted each other.

As illustrated in detail in FIG. 13, the two reinforcing ribs 80 end on the front side in front of the wall of the hollow rib H in the rim spider 3a so that the walls of the rim spider 3a and the rim well 2a can be fit together for connection, for example by welding, without any problems.

The ring rib 81a is pulled up and, as illustrated in detail in FIG. 12, reaches on the outside around the bolt receiving devices 68 in the rim spider. The ring rib 81a is preferably designed to be closed.

It should be clear that it is contemplated to provide any combination of the reinforcing ribs 61, 61a–61f, 62, 63, 64 on either of the rim spider 3a or the rim well 2a, or alernatively on both the rim spider 3a and the rim well 2a, depending upon design criteria including the wheel dimensions and material used, in order to provide a stable wheel while minimizing the amount of the material used to make the wheel.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wheel for a motor vehicle comprising a rim spider connected to a rim well,
    said rim spider and said rim well defining a plurality of hollow spokes, a plurality of air openings between said hollow spokes, a plurality of bolt receiving devices, and a hub,
    wherein the rim spider includes an interior surface and a plurality of reinforcing ribs on said interior surface, said reinforcing ribs being arranged in at least one of an area between adjacent of said air openings and an area between the bolt receiving devices and the air openings, at least one of said reinforcing ribs being a ring rib arranged concentrically with said hub, said ring rib connecting the bolt receiving devices with one another.

2. A wheel according to claim 1, wherein the rim well includes an interior surface, further comprising a plurality of additional reinforcing ribs on said interior surface of the rim well, said additional reinforcing ribs being arranged in at least one of an area between adjacent of said air openings and an area between the bolt receiving devices and the air openings.

3. A wheel according to claim 1, wherein an additional interior ring rib is constructed as a wheel hub.

4. A wheel for a motor vehicle comprising a rim slider connected to a rim well,
    said rim spider and said rim well defining a plurality of hollow spokes, a plurality of air openings between said hollow spokes, and a plurality of bolt receiving devices,
    wherein the rim spider includes an interior surface and a plurality of reinforcing ribs on said interior surface, said reinforcing ribs being arranged in at least one of an area between adjacent of said air openings and an area between the bolt receiving devices and the air openings, wherein the reinforcing ribs between adjacent air openings comprise at least two mutually crossing webs which are connected with opposite opening edges of the air openings and with the interior surface of the rim spider.

5. A wheel according to claim 4, wherein the mutually crossing reinforcing ribs have approximately half the height of the opening edges of the air openings.

6. A wheel according to claim 1, further comprising radially extending reinforcing ribs extending between the bolt receiving devices and a wheel hub of the rim spider.

7. A wheel according to claim 3, further comprising radially extending reinforcing ribs extending between the bolt receiving devices and a wheel hub of the rim spider.

8. A wheel for a motor vehicle comprising a rim spider connected to a rim well,
    said rim spider and said rim well defining a plurality of hollow spokes, a plurality of air openings between said hollow spokes, and a plurality of bolt receiving devices,
    wherein the rim spider includes an interior surface and a plurality of reinforcing ribs on said interior surface, said reinforcing ribs being arranged in at least one of an area between adjacent of said air openings and an area between the bolt receiving devices and the air openings, at least two of said reinforcing ribs extending from the bolt receiving devices to opening edges of the air openings.

9. A wheel according to claim 8, wherein the bolt receiving devices are arranged on a circle between the air openings and a wheel hub of the rim spider.

10. A wheel according to claim 8, wherein said plurality of reinforcing ribs include mutually crossing reinforcing ribs, wherein a cross-section of sections of the mutually crossing reinforcing ribs and the two reinforcing ribs on the bolt receiving device form approximately a parallelogram.

11. A wheel according to claim 8, wherein the reinforcing ribs on the bolt receiving devices have edges which extend in a diagonally rising manner from the opening edges of the air openings to the bolt receiving device.

12. A wheel according to claim 1, wherein the rim spider is made of a material selected from the group consisting of an aluminum alloy, a magnesium alloy, a titanium alloy, and a steel alloy.

13. A wheel according to claim 1, wherein the rim well is made of a material selected from the group consisting of an aluminum alloy, a magnesium alloy, a titanium alloy, and a steel alloy.

14. A wheel according to claim 12, wherein the rim well is made of a material selected from the group consisting of an aluminum alloy, a magnesium alloy, a titanium alloy, and a steel alloy.

15. A wheel according to claim 1, wherein the reinforcing ribs are spaced at a distance from the interior surface of the rim well on a side facing the rim well.

16. A wheel according to claim 1, further comprising a plurality of additional reinforcing ribs extending laterally between the air openings.

17. A wheel according to claim 1, further comprising a plurality of additional reinforcing ribs extending between the bolt receiving devices and an exterior edge of the wheel.

18. A wheel according to claim 1, further comprising a plurality of additional reinforcing ribs extending between an outer opening edge of the air openings and an exterior edge of the wheel.

19. A wheel for a motor vehicle comprising a rim spider connected to a rim well, said rim spider and said rim well defining a plurality of hollow spokes, a plurality of air openings between said hollow spokes, a plurality of bolt receiving devices, and a hub, wherein the rim well includes an interior surface and a plurality of reinforcing ribs on said interior surface, said reinforcing ribs being arranged in at least one of an area between adjacent of said air openings and an area between the bolt receiving devices and the air openings, at least one of said reinforcing ribs being a ring rib arranged concentrically with said hub, said ring rib surrounding the bolt receiving devices.

20. A method of manufacturing a wheel for a motor vehicle comprising:

forming a rim spider for connection to a rim well to form a wheel including a plurality of hollow spokes, a plurality of air openings between said hollow spokes, and a plurality of bolt receiving devices, wherein said rim spider is formed to define a plurality of reinforcing ribs on an interior surface of said rim spider in at least one of an area between adjacent of said air openings and an area between the bolt receiving devices and the air openings, at least one of said reinforcing ribs being a ring rib arranged concentrically with said hub, said ring rib connecting the bolt receiving devices with one another.

21. A method according to claim 20, further comprising forming a plurality of additional reinforcing ribs on an interior surface of the rim well, said additional reinforcing ribs being formed in at least one of an area between adjacent of said air openings and an area between the bolt receiving devices and the air openings.

22. A wheel according to claim 19, wherein said plurality of reinforcing ribs includes mutually crossing ones of said reinforcing ribs located between adjacent ones of said air openings, said mutually crossing ones being connected with opening edges of the air openings.

23. A wheel for a motor vehicle comprising a rim spider connected to a rim well, said rim spider and said rim well defining a plurality of hollow spokes, a plurality of air openings between said hollow spokes, a plurality of bolt receptacles, and a hub, wherein the rim spider includes an interior surface and an annular reinforcing rib on said interior surface concentric with said hub, said annular reinforcing rib connecting adjacent ones of said bolt receptacles.

* * * * *